UNITED STATES PATENT OFFICE.

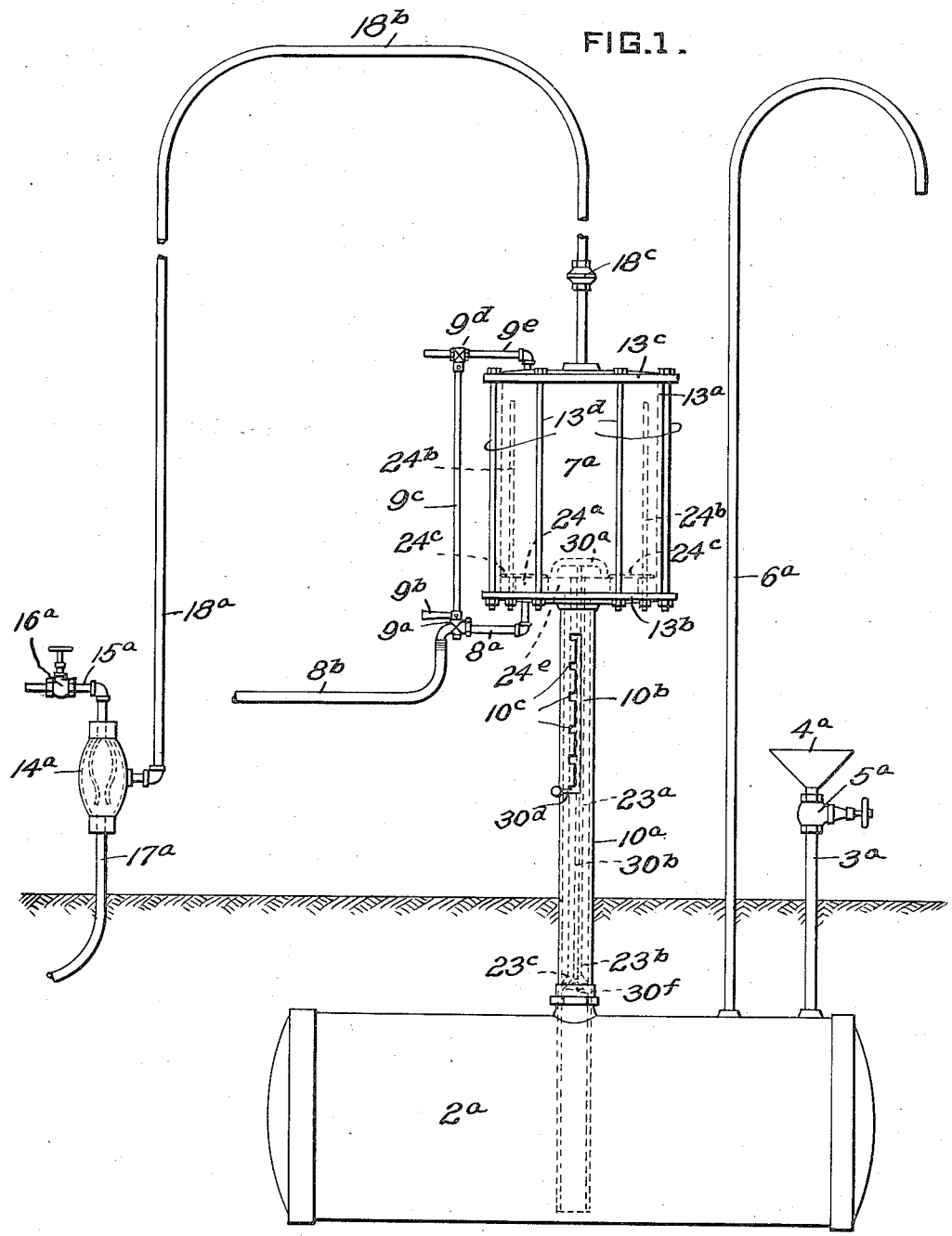

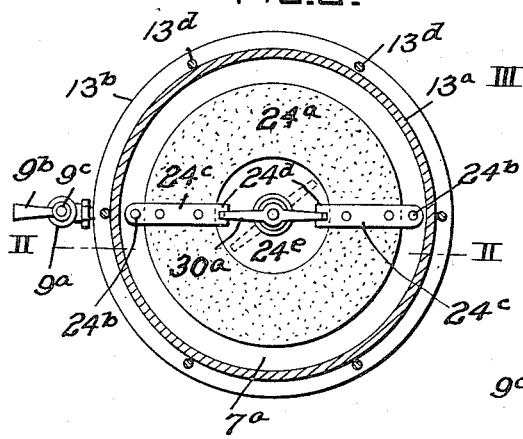
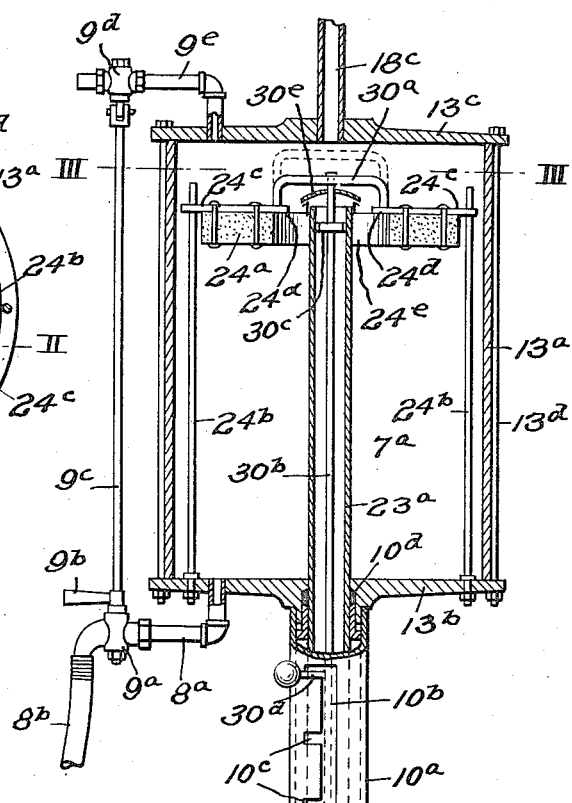
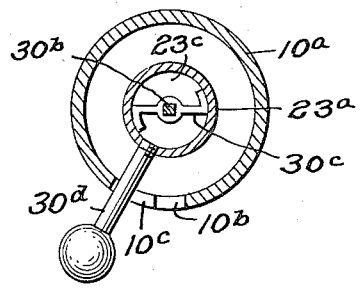
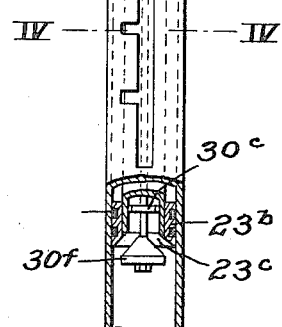

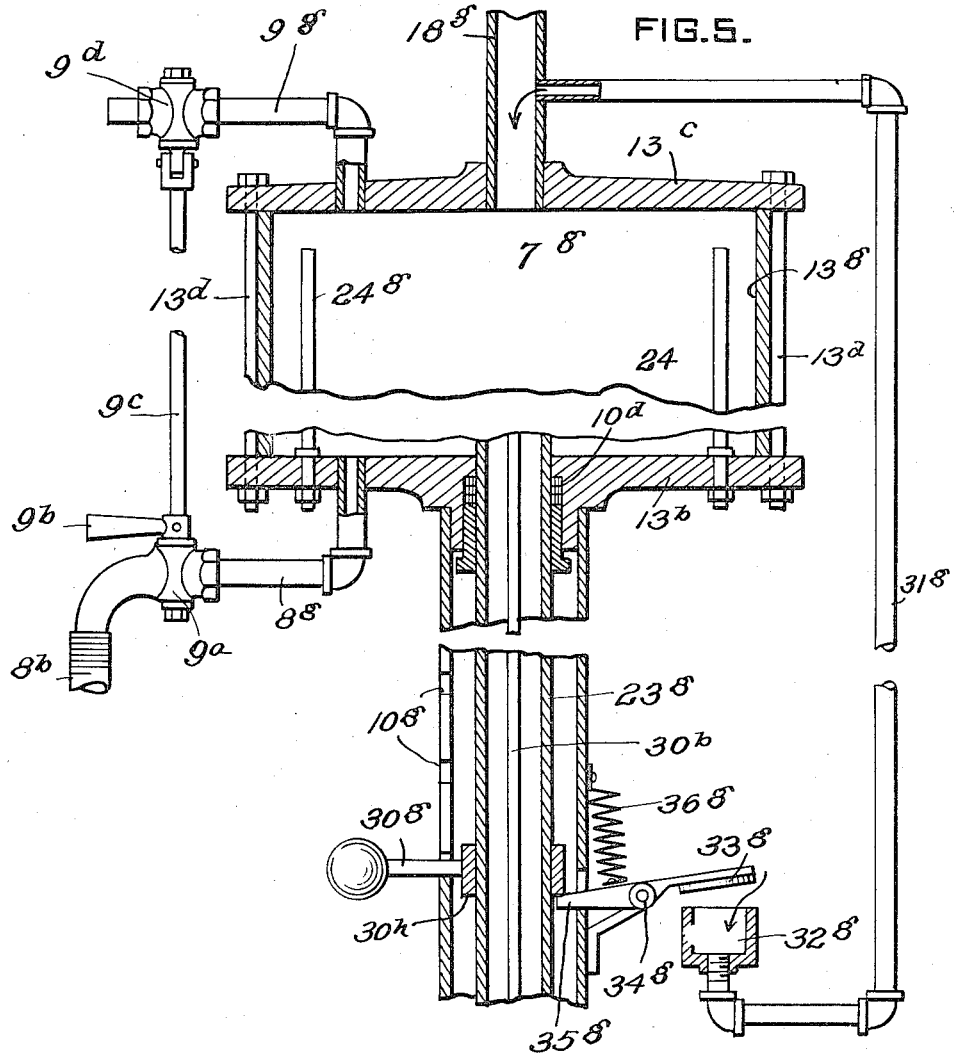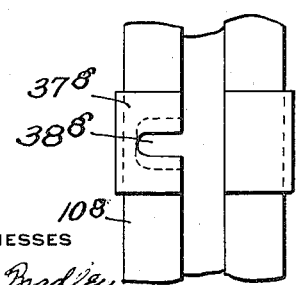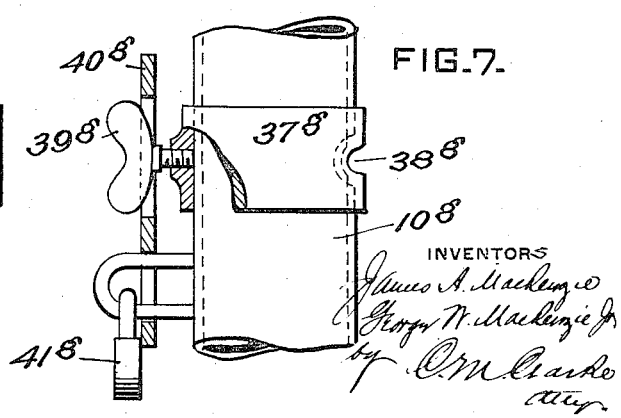

JAMES A. MacKENZIE, OF ROCHESTER, AND GEORGE W. MacKENZIE, JR., OF BEAVER, PENNSYLVANIA, ASSIGNORS TO THE GUARANTEE LIQUID MEASURE COMPANY, OF ROCHESTER, PENNSYLVANIA, A CORPORATION OF DELAWARE.

LIQUID-MEASURING APPARATUS.

1,242,831.     Specification of Letters Patent.     Patented Oct. 9, 1917.

Application filed June 14, 1915, Serial No. 33,897. Renewed March 7, 1917. Serial No. 153,167.

*To all whom it may concern:*

Be it known that we, JAMES A. MACKENZIE and GEORGE W. MACKENZIE, Jr., citizens of the United States, residing at Rochester and Beaver, respectively, in the county of Beaver and State of Pennsylvania, have invented certain new and useful Improvements in Liquid-Measuring Apparatus, of which the following is a specification.

Our invention consists of an improved apparatus for delivering gasolene or other liquids, preferably in measured quantities, from a superimposed measuring or secondary tank connected with a main reservoir provided with means for effecting the flow thereinto from the main reservoir, means for measuring the amount to be charged into the secondary tank, means for delivering the fluid from the secondary tank in such measured amounts, and various other features of improvement, as shall be more fully hereinafter set forth.

The invention, in general, is similar to that constituting the subject matter of our prior applications filed September 14, 1914, Serial No. 861547, and September 15, 1914, Serial No. 861775.

In the drawings,—

Figure 1 is a view of the apparatus in elevation, partly broken away.

Fig. 2 is an enlarged vertical sectional view, indicated by the line II. II. of Fig. 3, partly in elevation, of the measuring tank and its connected parts.

Fig. 3 is a cross section on the line III. III. of Fig. 2.

Fig. 4 is a cross sectional detail view on the line IV. IV. of Fig. 2.

Fig. 5 is a sectional view, partly broken away, similar to Fig. 2, showing a modified construction.

Figs. 6 and 7 are detail views in sectional elevation, showing modified constructions of the height-locating mechanism.

The apparatus is particularly designed for handling gasolene and the like, to utilize a storage tank or reservoir $2^a$ of well-known construction, preferably underground, and to withdraw a portion of the contents, as required, through a secondary or measuring tank.

The primary or storage tank or reservoir $2^a$ is provided with any suitable filling pipe $3^a$ having a funnel $4^a$ and a shut-off cock or valve $5^a$. A relief pipe $6^a$ for admitting and discharging atmospheric air is connected with the upper portion of the tank $2^a$ and may extend to any suitable point thereabove.

The secondary or measuring tank $7^a$, which may be of any suitable construction, is located at any desired elevation above the primary tank for delivering through a pipe $8^a$ having a controlling valve $9^a$ and a delivering hose extension $8^b$.

Valve $9^a$ is provided with an operating handle $9^b$ and an extended stem $9^c$ connected with the stem of a valve $9^d$ in an air line $9^e$ opening from the interior of tank $7^a$ to the atmosphere. By this means both valves $9^a$ and $9^b$ may be opened and closed together, closing the tank during filling by the pneumatic suction, and admitting air to allow the contents to flow out. If desired, the port of air valve $9^d$ may be so arranged as to open slightly before the opening of port of valve $9^a$ to insure prompt action.

A pipe $10^a$ leads from the bottom of tank $7^a$ to the lower portion of reservoir $2^a$ so as to insure exhausting the contents thereof, and is in communication with the interior of the tank through the central valve-controlled tube $23^a$ operable by the connection with float $24^a$, as hereinafter described.

Tank $7^a$ in the present construction consists of a cylindrical shell $13^a$, preferably of glass or other transparent material, clamped between a base $13^b$ and a top $13^c$ by means of a series of rods $13^d$ and any suitable intervening packing material, whereby to provide a fluid and air-tight chamber.

By having the body portion of the tank of transparent material, its contents and the operation may be observed at any time.

For the purpose of creating a partial vacuum in the tank any suitable air-exhausting means may be employed, as the siphon or injector $14^a$ of suitable construction connected with any source of fluid pressure, as by pipe $15^a$ having a suitable controlling valve $16^a$ connected to an ordinary supply main or system, and having a waste pipe $17^a$ leading to a sewer or suitable point of discharge.

A suction pipe $18^a$ is connected with the upper end of tank $7^a$, preferably by an upper extension $18^b$, which may, if desired, extend to a sufficient height to be beyond the range of the ultimate possible rise of the fluid upwardly above tank 7ª. A check valve 18ᶜ is preferably inserted in said pipe a short distance above the tank, operable to open for exhaust and close against pressure backwardly to the tank, so as to maintain the partial vacuum therein upon stopping operation of the injector 14ª.

From the foregoing description it will be seen that, when air is exhausted from the interior of tank 7ª, liquid will rise from main reservoir 2ª through pipe 10ª and telescoping conduit 23ª, and will fill the tank 7ª more or less.

For the purpose of providing means for controlling the filling of the secondary tank 7ª to any desired or predetermined capacity, float 24ª is arranged to freely rise and fall therein upon the surface of the contained liquid.

Said float, which may be of cork or other light buoyant material, is loosely mounted for vertical travel upon guiding rods 24ᵇ within the tank, which the float engages by sliding arms 24ᶜ for vertical movement. Said arms extend inwardly by their inner terminals 24ᵈ beyond the periphery of an inner annular opening 24ᵉ of the float, and provide limiting abutments for a transverse supporting bracket 30ª secured upon the upper end of a central valve rod 30ᵇ.

Said rod extends downwardly through guides 30ᶜ, which are in the form of transverse spiders, as clearly shown in Fig. 4, and which engages the stem 30ᵇ by a squared or splined portion, as shown, so that the conduit 23ª and stem 30ᵇ may be partially rotated together by means of an operating trigger or handle 30ᵈ. Said handle extends outwardly through a vertical slot 10ᵇ in conduit 10ª, having at predetermined positions offset slots or arresting openings 10ᶜ, and a valve 30ᶠ is connected to the lower end of stem 30ᵇ adapted to seat against the valve seat 23ᶜ of conduit 23ª.

The lower end of conduit 23ª has a sliding and fluid-tight sealing engagement within conduit 10ª by means of a packet head 23ᵇ, having at its lower end the valve seat 23ᶜ. The conduit 23ª itself has a sliding engagement with the central portion of base 13ᵇ by means of a surrounding packet gland and stuffing box 10ᵈ.

The upper end of the conduit 23ª is preferably provided with a splash coping 30ᵉ, by which the upwardly rising fluid is deflected downwardly into the tank.

Locking apertures 10ᶜ are positioned at intervals above the bottom of slot 10ᵇ corresponding to any desired unit of measurement, as for instance, one gallon.

When arm 30ᵈ is thrown around into register with vertical slot 10ᵇ, it at the same time rotates the bracket arm 30ª out of alinement with the inner ends of guide strips 24ᶜ, as indicated in dotted lines in Fig. 2, so that the conduit 23ª and its valve mechanism and rod may be raised or lowered to any desired position.

Upon raising the conduit 23ª and its bracket arm 30ª to the level of any one of the notches, as for instance, to the fifth, as shown in Fig. 2 (corresponding to a five gallon measurement), and then shifting the handle 30ᵈ into the socket 10ᶜ, the bracket 30ª will be thrown around into registering position in alinement with the inner ends 24ᵈ of arms 24ᶜ. Thereupon, by exhausting the air from the interior of tank 7ª by the mechanism above described, fluid will rise through conduits 10ª and 23ª, carrying up with it float 24ª from the bottom, and the float, by its arms 24ᶜ, will engage the bracket 30ª, carrying it upwardly to the position indicated in dotted lines in Fig. 2, thereby seating valve 30ᶠ and shutting off the supply.

The tank thus being filled to the desired capacity, corresponding to the amount to be drawn off, the suction mechanism is discontinued, and check valve 18ᶜ seated, whereupon, by manipulation of valve lever 9ᵇ, air is admitted into the upper portion of the tank 7ª, and the contents are drawn off, as will be clearly understood.

Also, by merely lifting conduit 23ª to any desired height, it will be seen that its upper end determines the level of the liquid within the tank quite independent of the float, should it be desired to use the machine without the float 24ª and valve 30ᶠ. In such case all that is necessary is merely to discontinue the suction, admit air into the top of tank 7ª, whereupon any surplus will flow back to the level of the erected level regulating tube 23ª.

When the conduit 23ª is used independently of the float, it is merely raised by the handle 30ᵈ as described and the liquid will fill the tank up to its top and will then overflow back, leaving the tank full to the level of the conduit.

Should it be desired however to return all or any portion of the contents of the tank to the main reservoir, this may be done by merely lowering the conduit to bring its top level with the bottom of the tank. In the event that there is any liquid remaining in the conduit, or if for any reason it is desired to positively drain off all liquid from the tank and conduit, and to insure a releasing air supply, we provide the device shown in Fig. 5.

The adjustable conduit 23ᵍ communicates freely at its bottom with the main conduit 10ᵍ, in which case the float 24ª and valve 30ᶠ and the other coöperating parts are eliminated.

A pipe 31ᵍ communicates with the upper portion of the measuring tank in any suitable way, as by connection with the suction pipe 18ᵍ, and is provided with an inlet terminal or cup 32ᵍ.

A valve 33ᵍ is pivoted at 34ᵍ and has an arm 35ᵍ extending inwardly through a slot in pipe 10ᵍ into the path of the ring 30ʰ to which handle 30ᵍ is secured, a spring 36ᵍ being provided to insure seating of the valve. By this means, when conduit 23ᵍ is lowered to its full extent, valve 33ᵍ is opened, admitting air.

This device also prevents the filling of the tank by the creation of a partial vacuum, until the conduit 23ᵍ has first been elevated from its lowermost position.

For the purpose of providing very accurate adjustment of the registering notches for handles 30ᵈ and 30ᵍ, we provide separate vertically divided rings 37ᵍ each having a lateral notch 38ᵍ which may be adjusted with relation to an enlarged notch or opening in the main pipe 10ᵍ, as indicated in dotted lines.

Each ring is provided with a securing set screw 39ᵍ by which the ring and its notch may be exactly set to the correct position for accurate measurement.

When desired, all the set screws may be locked to prevent unauthorized adjustment by means of a slotted bar 40ᵍ adapted to fit over them and to be secured by any suitable locking means, as a padlock 41ᵍ. It will be understood that the foregoing adjusting device is applicable to either of the constructions above described, as is also the valve manipulating mechanism, if desired.

The operation of the above described machine is generally similar to that heretofore described, but provides a construction having certain advantages in the characteristics of the measuring tank and its valve mechanism.

The advantages of the invention will be readily appreciated by all those familiar with this class of mechanism.

It presents to the purchaser a visible operation of measuring the exact amount of liquid, together with the delivery to him of the whole of the measured amount, in exactly measured quantities, with complete draining of the measuring tank, and facilitating return to the main tank of any unused or unmeasured liquid remaining in the vertical conduits.

It is continuously reliable in its operation, comparatively simple and cheap in construction, very safe when used with combustible or explosive liquids, as gasolene, benzin, etc., and is capable of use with any other liquids, as oil, vinegar, etc.

The construction may be variously changed in design, proportions, detail arrangement, or otherwise by the skilled mechanic, but all such changes are to be considered as within the scope of the following claims.

What we claim is:

1. In combination, a main reservoir, a superimposed measuring tank, a pipe leading from the reservoir to the measuring tank, a vertically movable conduit extending from the measuring tank into the reservoir pipe and having at its upper end a splash coping, means for locating said conduit at any predetermined position, means for exhausting the air from the measuring tank, and means for drawing off its contents.

2. In combination, a main reservoir, a superimposed measuring tank, a pipe leading from the reservoir to the measuring tank, a vertically movable conduit extending from the measuring tank into the reservoir pipe and having means for locating it at any predetermined position, a float, a valve controlling circulation through said conduit having a stem, means providing for rotation of the conduit and said stem together and for connection and disconnection with the float, means for exhausting the air from the measuring tank, means for drawing off its contents, and means for admitting air to the upper portion of the measuring tank.

3. In combination, a main reservoir, a superimposed measuring tank, a pipe leading from the reservoir to the measuring tank, a vertically movable conduit extending from the measuring tank into the reservoir pipe and having means for locating it at any predetermined position, means for exhausting the air from the measuring tank, means for drawing off its contents provided with a controlling valve, and an air supply pipe opening into the top of the tank having a valve connected with said controlling valve.

4. In combination, a main reservoir, a superimposed measuring tank, a pipe leading from the reservoir to the measuring tank, a float within the measuring tank, a vertically movable conduit extending from the measuring tank into the reservoir pipe provided with a lower terminal valve seat, a valve therefor having a stem extending upwardly through the movable conduit and having a limiting abutment adapted to be engaged by the float and to be adjusted to non-engaging position, means for exhausting the air from the measuring tank, and means for draining off the contents.

5. In a measuring tank of the class described, the combination therewith of a main supply pipe having interlocking openings through its side, a vertically adjustable circulation conduit therein having packed engagement with the interior of said pipe and provided with a laterally projecting locking handle extending through the main pipe and coöperable with the openings therein.

6. In a measuring tank of the class described, the combination therewith of a main supply pipe having interlocking openings through its side, a vertically adjustable circulation conduit, therein having packed engagement with the interior of said pipe and provided with a laterally projecting locking handle extending through the main pipe and coöperable with the openings therein, and having a valve seat at its lower end, a float within the measuring tank, and a valve for said seat having a stem extending upwardly through the circulation conduit and adapted to be actuated by said float.

7. In a measuring tank of the class described, the combination therewith of a main supply pipe having interlocking openings through its side, a vertically adjustable circulation conduit therein having packed engagement with the interior of said pipe and provided with a laterally projecting locking handle extending through the main pipe and coöperable with the openings therein, and having a valve seat at its lower end, a float within the measuring tank, a valve for said seat having a stem extending upwardly through the circulation conduit and through an opening in the float and having at its upper end a bracket arm adapted to be engaged by the float.

8. In a measuring tank of the class described, the combination therewith of a main supply pipe having interlocking openings through its side, a vertically adjustable circulation conduit therein' having packed engagement with the interior of said pipe and provided with a laterally projecting locking handle extending through the main pipe and coöperable with the openings therein, and having a valve seat at its lower end, a float within the measuring tank, a valve for said seat having a stem extending upwardly through the circulation conduit and through an opening in the float and having at its upper end a bracket arm adapted to be engaged by the float, said valve stem and circulation conduit being rotatable together by said handle to engaging or disengaging position with relation to the float.

9. In combination with a main reservoir, a superimposed measuring tank a pipe leading from the reservoir to the measuring tank having a vertical slot, means for exhausting air from the measuring tank, means for drawing off its contents, a vertically adjustable pipe extending from the measuring tank into the reservoir pipe having a valve, and a float within the measuring tank operable to actuate said valve; an adjustable slotted device embracing the reservoir pipe having a holding opening, and a stem secured to the adjustable pipe extending through the slot in the reservoir pipe and adapted to be inserted in said holding opening.

10. In combination with a main reservoir, a superimposed measuring tank, a pipe leading from the reservoir to the measuring tank having a vertical slot, means for exhausting air from the measuring tank, means for drawing off its contents, a vertically adjustable pipe extending from the measuring tank into the reservoir pipe having a valve, and a float within the measuring tank operable to actuate said valve; an adjustable slotted device embracing the reservoir pipe having a holding opening, means for locking said slotted device in position, and a stem secured to the adjustable pipe extending through the slot in the reservoir pipe and adapted to be inserted in said holding opening.

In testimony whereof we hereunto affix our signatures in the presence of two witnesses.

JAMES A. MacKENZIE.
GEORGE W. MacKENZIE, Jr.

Witnesses:
W. A. HECKMAN,
C. M. CLARKE.